(12) United States Patent
van Dijk et al.

(10) Patent No.: US 8,555,281 B1
(45) Date of Patent: Oct. 8, 2013

(54) SCHEDULING OF TASKS BASED UPON HISTORICAL EXECUTION TIMES

(75) Inventors: Luuk van Dijk, Zurich (CH); Andras Erdei, Zurich (CH); Nils Richard Ekwall, Stafa (CH)

(73) Assignee: Google Inc., Mountain View, CA (US)

( * ) Notice: Subject to any disclaimer, the term of this patent is extended or adjusted under 35 U.S.C. 154(b) by 73 days.

(21) Appl. No.: 13/028,935

(22) Filed: Feb. 16, 2011

(51) Int. Cl.
*G06F 9/46* (2006.01)
(52) U.S. Cl.
USPC .......................................... 718/100; 718/102
(58) Field of Classification Search
None
See application file for complete search history.

(56) References Cited

U.S. PATENT DOCUMENTS

| | | | |
|---|---|---|---|
| 2003/0120708 A1* | 6/2003 | Pulsipher et al. | 709/106 |
| 2009/0157606 A1* | 6/2009 | Dettinger et al. | 707/3 |
| 2011/0154358 A1* | 6/2011 | Di Balsamo et al. | 718/105 |

* cited by examiner

*Primary Examiner* — Emerson Puente
*Assistant Examiner* — Dong Kim
(74) *Attorney, Agent, or Firm* — Sterne, Kessler, Goldstein & Fox P.L.L.C.

(57) ABSTRACT

Methods, systems, and implementations are disclosed to schedule a plurality of tasks on one or more processors. The tasks may be part of a larger job based on a user initiated query for information retrieval. One example method of operation may include estimating, based upon historical actual execution times of tasks of a respective corresponding type, an expected execution time for each task of the plurality of tasks. The method may further include scheduling the plurality of tasks for execution on the one or more processors based upon the estimated expected execution time of each task. The scheduling procedure utilized ultimately produces an optimized task execution schedule, and in turn, minimizes the expected job completion time.

17 Claims, 10 Drawing Sheets

Job Finishes at approximately 5.5 time units

Job Finishes at
approximately 5.5
time units

Job Finishes at
approximately 3.5
time units

Job Finishes at approximately 5 time units

Job Finishes at approximately 3 time units

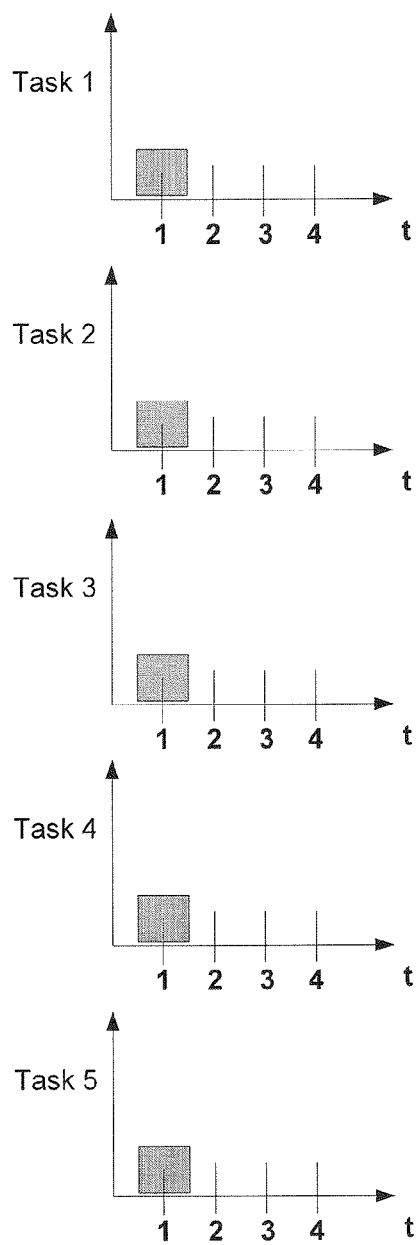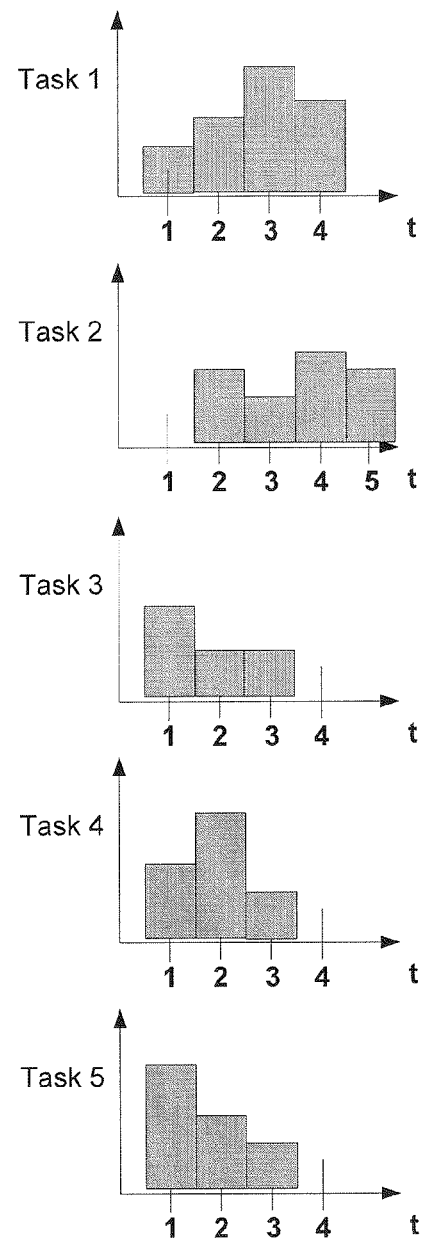
At System Startup
After Ten Minutes
FIG. 3A
FIG. 3B

600

| Task type | Time initiated HH:MM:SS | Date initiated DD:MM:YYYY | Execution time |
|---|---|---|---|
| Parse | 16:00:06 | 01:05:6010 | 0061 |
| Parse | 14:10:00 | 01:05:6010 | 0009 |
| Search | 16:00:10 | 01:05:6010 | 0130 |
| Search | 14:10:50 | 01:05:6010 | 0604 |
| ⋮ | ⋮ | ⋮ | ⋮ |

FIG. 6

SCHEDULING OF TASKS BASED UPON HISTORICAL EXECUTION TIMES

BACKGROUND

1. Field

Embodiments of this invention relate generally to scheduling tasks on one or more processors.

2. Background

Internet websites and other large-scale online user applications receive numerous queries and information requests based on common user operations. For instance, a user may visit a website or access an application and begin selecting certain options for viewing purposes, information retrieval, etc. The users' expectations include instant feedback in real-time. As a result, users may become unsatisfied with any website or application that fails to provide such instant feedback.

As applications become increasingly complicated and require the use of multiple database informiation retrieval, remote access requests, and other information retrieval services, it may become increasingly difficult to satisfy user requests. Such requests may become even more challenging when faced with simultaneously servicing numerous such requests at any instant in time.

Services that translate queries include websites, such as mapping services, which may require actual geo-location calculations and database information retrieval all within a matter of seconds. Globally accessible websites may receive several thousand queries a second generating multiple corresponding jobs. These queries or requests must be organized and separated into jobs having corresponding tasks. For example, one large group of jobs may be modified into smaller groups, which may, in turn, have corresponding dependencies on each other.

Minimizing the response time for performing the query and returning it back to the user may pose challenges. The execution times of the jobs and tasks may be unknown and unpredictable. Various different tasks may require different amounts of time to process. If the execution times were well established it may be easier to organize the task processing times. Organizing task types may be one way to estimate an execution time. However, designating a single task as requiring a certain execution time without fault raises uncertainties.

BRIEF SUMMARY

Methods, systems, and computer program products are disclosed to provide an optimized task scheduling and completion procedure. Multiple tasks may be part of a job that needs to be completed and returned in real-time.

According to an embodiment, a method of scheduling a plurality of tasks on one or more processors may provide certain operations. Those operations may include estimating, based upon historical actual execution times of tasks of a respective corresponding type, an expected execution time for each task of the plurality of tasks, and scheduling the plurality of tasks for execution on the one or more processors based upon the estimated expected execution time of each task.

According to another embodiment, a system for scheduling a plurality of tasks on one or more processors is disclosed. The system may include one or more processors, and an execution time estimator communicatively coupled to the one or more processors and further configured to perfoiin certain operations. Examples of those operations may include to estimate, based upon historical actual execution times of tasks of a respective corresponding type, an expected execution time for each task of the plurality of tasks. The system may also include a task scheduler communicatively coupled to the one or more processors, which is configured to schedule the plurality of tasks for execution on the one or more processors based upon the estimated expected execution time of each task.

According to yet another embodiment, a computer program product comprising a computer readable medium having computer program logic recorded thereon for enabling a processor to schedule a plurality of tasks on one or more processors is disclosed. The computer program logic includes a first logic module and a second logic module. The first logic module is configured to estimate, based upon historical actual execution times of tasks of a respective corresponding type, an expected execution time for each task of the plurality of tasks. The second logic module is configured to schedule the plurality of tasks for execution on the one or more processors based upon the estimated expected execution time of said each task.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 3A illustrates a group of exemplary charts demonstrating task processing times as estimated at system startup, according to an embodiment.

FIG. 3B illustrates a group of exemplary charts demonstrating task processing times as measured after some time interval from system startup, according to an embodiment.

FIG. 6 illustrates a table including task related fields of information, according to an embodiment.

DETAILED DESCRIPTION

While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

Embodiments disclosed in the specification may provide examples of processing a request in a processing server. The request can often be split into multiple tasks, some of which can be executed in parallel on different CPUs. The tasks may have dependencies that restrict the order of their execution, and, in turn, the order of task scheduling. Keeping track of the time consumption required for each task may provide measuring and recording results of a histogram of time consumption of each task. The time consumption measurements provide a basis for scheduling the tasks. The scheduling would ideally be optimized to produce a shortest overall processing time for completing the processing of all tasks of a given job. In an effort to optimize job completion, the tasks may be ordered according to an execution plan.

Task execution may be performed in a substantially parallel manner, meaning that although task execution may be simultaneous, task execution may also be overlapping. In other words, some tasks may be processed with a common beginning time and ending time, a common beginning time and a varying end time, or overlapping with at least one other task but without a common beginning time. In another example, tasks may be partly simultaneous as tasks included in a single group may be handled separately over "n" processors. Tasks may also be time sliced on a single processor to process parts of a task over a period of time. Furthermore, groups may also be interdependent and include tasks that must be processed first in one group in order to process tasks in other groups.

Figure 1A:
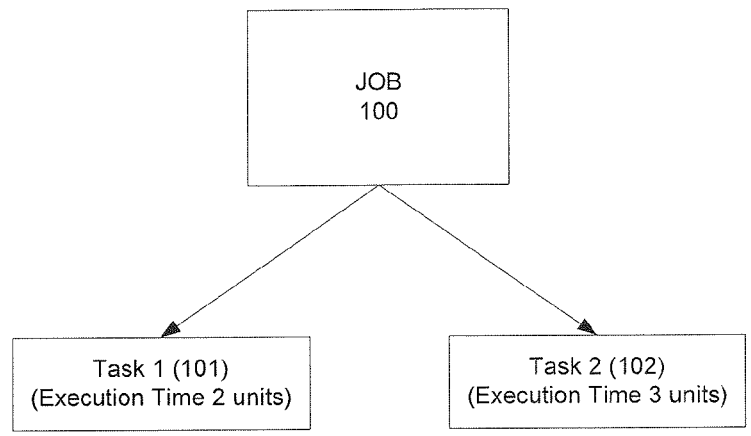
FIG. 1A illustrates an exemplary job including tasks associated with processing the job.

FIG. 1A illustrates an exemplary job including tasks associated with processing the job. Referring to FIG. 1A, a job 100 is illustrated as being associated with two known tasks 101 and 102. Either task could be processed or executed before the other, or, the tasks may be executed simultaneously. Task 101 is known to require two time units to process, and task 102 is known to require three time units to process. The time units may be any time measurement used to measure the amount of time needed to complete a processing or execution of a particular task (e.g., seconds, milliseconds, microseconds, nanoseconds, etc.).

In this example of FIG. 1A, tasks 1 and 2 are not interdependent, and either task 1 or task 2 could be processed before the other task is processed. The tasks may be derived from the job 100 based on a user query that was received at a receiving server or database server (not shown). The job 100 may be received and deconstructed into tasks 101 and 102 with corresponding dependencies. In the process of handling the job, the tasks may be processed in parallel or separately in sequence. The dependencies, if there are any, may include data requirements, such as causal data that is required for another task to be performed. Other dependencies may include updated information retrieved from a previous query. Tasks that are interdependent may be grouped together in a single group having a corresponding execution order based on the dependencies.

Figure 1B:
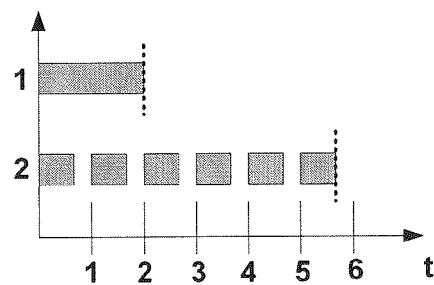
FIGS. 1B & 1C illustrate exemplary charts demonstrating task processing time.
Figure 1C:
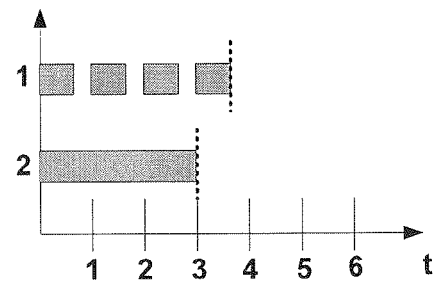

FIGS. 1B & 1C illustrate exemplary charts demonstrating task processing time in two different scheduling scenarios, where the entire processing capacity of one processor and half the processing capacity of another processor are available to process tasks 1 and 2 (task identifiers are shown on the y-axis). Task 1 has an execution time of 2 time units and task 2 has an execution time of 3 time units. Referring to FIG. 1B, task 1 is scheduled on the processor with its full capacity whereas task 2 is scheduled on the processor having half its processing capacity. The first task of the job is processed in approximately 2 time units and the second task is processed over a period of 5.5 time units. As a result, for the job 100 to be completed, both tasks 1 and 2 must be finished, which resulted in 5.5 time units to complete the job. FIG. 1C illustrates the same tasks 1 and 2, with task 2 (which has the 3 time unit execution time) being scheduled on the processor with full capacity and task 2 being scheduled on the processor with half capacity. In the example of FIG. 1C, the job can be expected to finish at 3.5 time units, which is a substantially faster completion time for the job comprising tasks 1 and 2, when compared to a job completion duration of 5.5 time units.

Figure 2A:
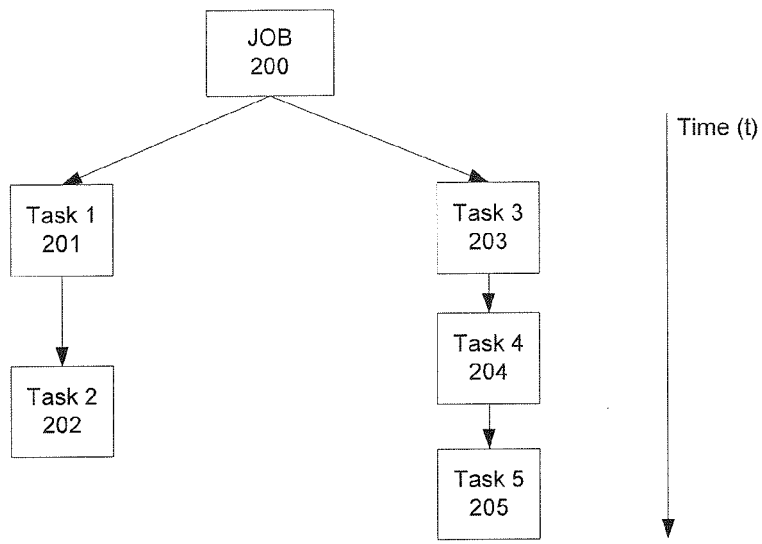
FIG. 2A illustrates a job processing diagram including tasks associated with processing the job, according to an embodiment.

FIG. 2A illustrates an exemplary job processing diagram including tasks associated with processing the job. Referring to FIG. 2A, two branches of a job 200 are illustrated as requiring different amounts of time (t). In order to schedule and process the various tasks 201, 202, 203, 204 and 205, it may be prudent to estimate or look-up an amount of time that is needed to process the tasks. The raw number of tasks may or may not provide a total processing time required to execute a chain of tasks. For example, tasks 201 and 202, although, fewer in number than tasks 203 through 205, may take longer to process. One approach may be to prioritize certain tasks, such as, tasks 203, 204 and 205, especially if it is estimated that those tasks take longer to process.

Figure 2B:
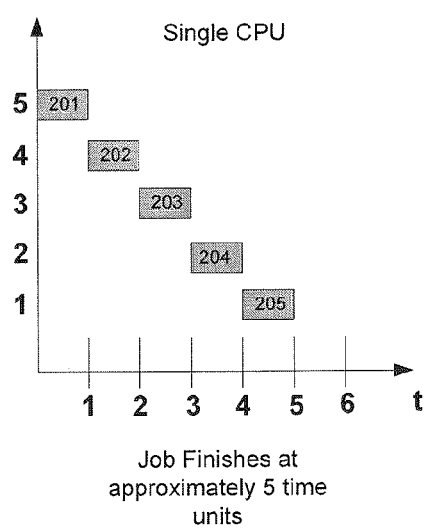
FIG. 2B illustrates a chart demonstrating task processing time for a single CPU, according to an embodiment.
Figure 2C:
FIG. 2C illustrates a chart demonstrating task processing time for two CPUs, according to an embodiment.

FIG. 2B illustrates an exemplary chart demonstrating task processing time for a single CPU. Referring to FIG. 2B, the tasks 1-5 or 201-205 are illustrated as being processed over a period of time with a single CPU. Assuming the tasks each require one time unit to process, then each of the tasks will be processed with one CPU, in order, one after another. In this scenario, the tasks are processed one at a time over a period of 5 time units. FIG. 2C illustrates a chart demonstrating task processing time for two CPUs, according to an embodiment. Referring to FIG. 2C, the same five tasks 201-205 are illustrated as being processed over a period of 3 time units. In the case of two CPUs, tasks 202 and 205, and, 204 and 201, are processed simultaneously, so the last task 203 may be processed to produce an overall processing time of 3 time units.

In operation, when a query is received, the job may be decomposed into tasks, which are processed to measure the time required to finish the job. Recording this information may create past knowledge or historical processing time information. For example, in FIGS. 2A-2C, the examples are all based on one time unit of processing time for each task. However, such a basic assumption about the time required to process a task is not accurate, especially when other variables are introduced into the processing time (e.g., time of day, task type, etc.).

FIG. 3A illustrates a group of charts demonstrating task processing times as estimated at system startup according to an embodiment. Referring to FIG. 3A, the fundamental approach to estimate task processing time would be to initially assume that all tasks 1-5 require only one time unit to process. Such an assumption may be made at system startup, to provide a baseline for more accurate task processing time estimation at a later time.

FIG. 3B illustrates a group of charts demonstrating task processing times as measured some time after system startup according to an embodiment. Referring to FIG. 3B, the tasks 1-5 have been processed to yield varying amounts of time required for processing. In this example of FIG. 3B, it is assumed that an appreciable amount of time has passed since system startup (e.g., ten minutes). The median time unit values are obtained from the various past execution times that have been recorded. For task 1, the median is 3, task 2 produces a median of 4, task 3 produces a median of 1, task 4 produces a median of 2, and task 5 produces a median of 1. Execution times may be estimated over a predefined period of time, such as a period of time during the day, evening or a number of days. Execution time estimation may be adaptive so that statistical analyses of previous execution times can create a moving average of estimated task processing times.

Referring to FIG. 3A, a critical path used to perform task execution or processing may include analyzing path task processing of task path branch 3-4-5 vs. path task processing of task path branch 1-2. The critical path for the job is the minimum duration in which all tasks of the job can be completed. For a task, the critical path length is the duration from the beginning of the task to the end of the job. The 3-4-5 task branch path will require 3 time units vs. the 1-2 task branch path, which requires two time units, since all tasks have the same initial estimated execution time of one time unit. Once the actual results of processing related tasks have been measured over a defined time interval, the median values produced may modify the previously accepted path task processing times.

Referring to FIG. 3B, the measured median values may provide a task execution path for task branch 1-2 of 7 time units (median 3 time units+median 4 time units=7 time units). A task execution path branch for 3-4-5 may yield 4 time units (median 2 time units+median 1 time unit=3 time units). Since the actual measurements yielded a longer processing time for task branch 1-2 (7 time units) than task branch 3-4-5 (4 time units), the scheduling should favor task branch 1-2 to ensure that the task branch requiring a longer processing time is processed before other tasks. The critical paths for both task branches 1-2 and 3-4-5 may be more accurately determined by using the actual recorded running times of the tasks, and calculating estimated median values to produce a more accurate time estimate.

Figure 4A:
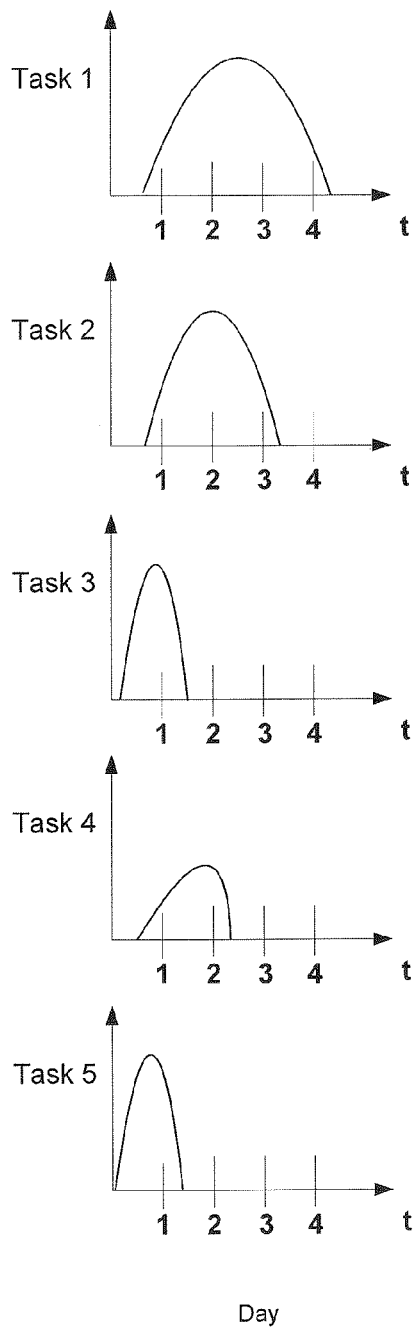
FIG. 4A illustrates a group of exemplary charts demonstrating task processing times as measured during the day time, according to an embodiment.
Figure 4B:
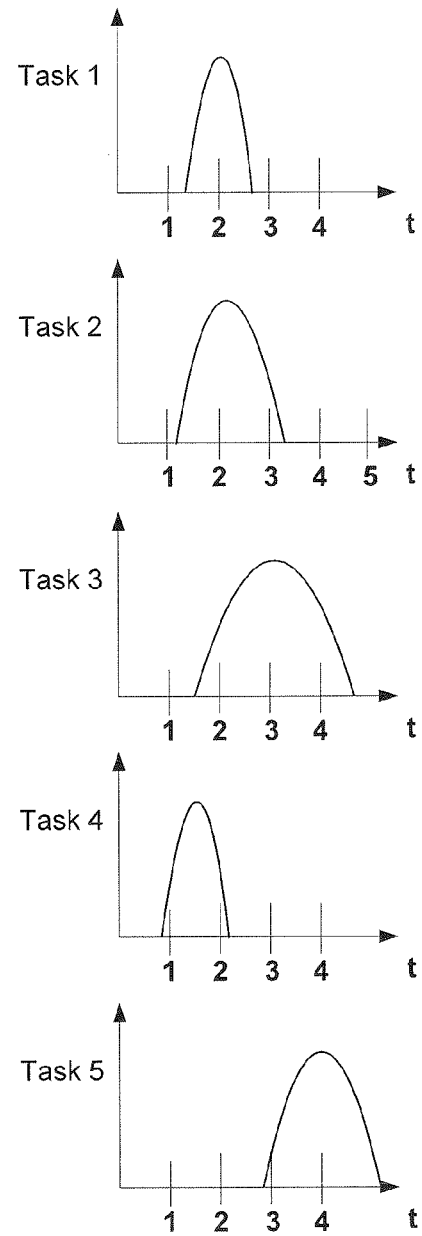
FIG. 4B illustrates a group of exemplary charts demonstrating task processing times as measured during the night time, according to an embodiment.

FIG. 4A illustrates a group of exemplary charts demonstrating task processing times as measured during the day according to an embodiment. Referring to FIG. 4A, the day time estimates of the task completion times may be taken to obtain median processing times for each task. The day time measurements may be performed at varying times during the day, at peak utilization times and/or a combination of both. As may be observed from the graphs of tasks 1-5, the amount of time to process each task varies according to the time of day. In this example, it may be assumed that the critical path is based on tasks 1 and 2 (i.e., task branch 1-2). Referring to FIG. 4B, the tasks 1-5 are illustrated as having different processing times as measured during evening hours. Based on the results of FIG. 4B, the critical path may instead be task branch 3-4-5, as the more preferred path is used to optimize the task processing and corresponding job completion.

Figure 5:
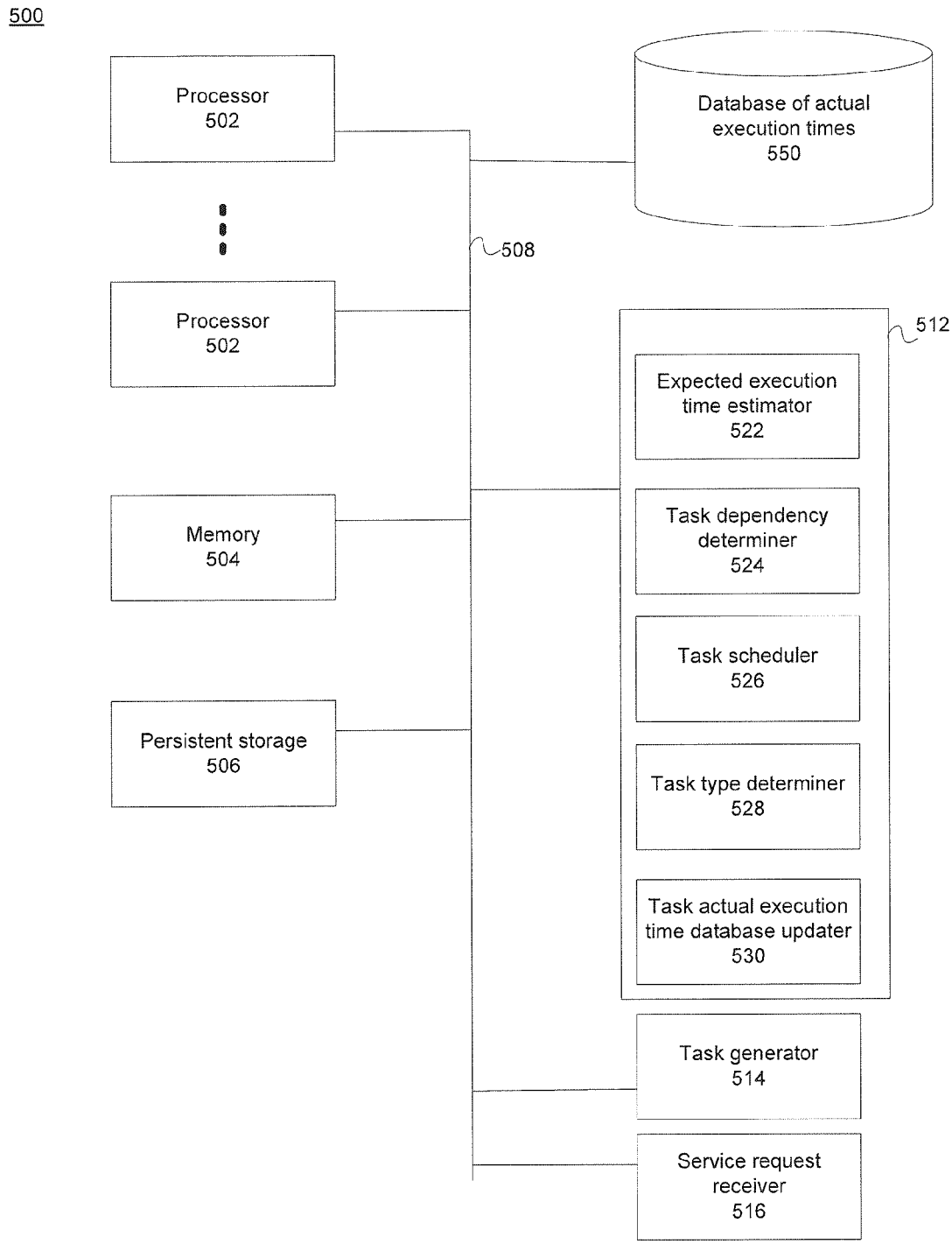
FIG. 5 illustrates a system configured to perform the operations associated with examples included in the disclosure, according to an embodiment.

FIG. 5 illustrates a system 500 configured to perform the operations associated with examples included in this disclosure, according to an embodiment. Referring to FIG. 5, a processor, or multiple processors 502 are illustrated as being coupled to a memory 504, and persistent data storage unit 506, each of which may be part of a computing device(s) and in communication over a communication bus 508. Processor 502 can include one or more central processing unit (CPU), graphics processing unit (GPU), digital signal processor (DSP), field programmable gate array (FPGA), or other processor capable of executing tasks. Processor 502 can be included in a server, a personal computer, a mobile device, entertainment platform, server farm, or other computing environment in which multiple tasks are executed to implement a particular job. Memory 504 can include a volatile memory such as random access memory (RAM) or like memory. A persistent data storage unit 506 can include memory such as a hard disk, flash memory, or other type of non-volatile memory. Communication bus 508 can include one or more of a Peripheral Component Interconnect (PCI) bus, PCI Express bus, or other system interconnection mechanism. Communication bus 508 can also include one or more network device types such as Ethernet, Bluetooth, WIFI, and the like.

A database of actual execution times 550 may be coupled to the computing device or in communication with the computing device. The term "database" as used herein is intended to indicate a collection of data, structured or unstructured, and is not intended to necessarily require a database system such as commercially available database systems. Database 550 is a repository to collect historical execution times categorized by task type identifiers. The type of a task can be determined based on predetermined criteria.

A task generator 514 may be used to generate tasks based on a received query or service request received at a service request receiver 516. The request may be a request for service, or, remote procedure call (RPC). A request for service may be in the form of a query sent to a server from a web browser. According to an embodiment, task generator 514 can be configured to, upon receiving the service request, create a process to coordinate and respond to the received service request or query. That higher level process created to coordinate the response to the service request can, in turn, generate a plurality of other tasks that respectively handle one or more processing aspects required to respond to the service request.

A historical time task scheduling module 512 may be used to optimally schedule the tasks generated by the task generator 514 based upon historical execution times for the various task types. According to an embodiment, module 512 includes an expected execution time estimator 522, a task dependency determiner 524, a task scheduler 526, a task type determiner 528, and a task actual execution time database updater 530.

The expected execution time estimator 522 is configured to determine an estimated expected execution time for each respective task or process. It may also be configured to designate an initial time estimation for each task type so that the estimation based on actual historical times can take place over time.

A task dependency determiner 524 can be configured to determine whether the tasks are related or dependent upon one another. Task interdependencies can be used in determining the groupings and scheduling of tasks. According to an embodiment, task dependencies may be determined by constructing a dependency graph. An exemplary dependency graph is illustrated in FIG. 2A.

A task scheduler 526 may then calculate times for the tasks to be initiated for execution on a processor based on the task management procedures including, for example, the estimated expected execution time for corresponding task types. According to an embodiment, the task scheduler creates a schedule for the execution of tasks to complete a job, such as, the response to a service request.

A task type determiner 528 is configured to determine whether each task is of a particular task type. The type of a task can, according to an embodiment, determine the estimated expected execution time corresponding to that task.

After the tasks have been executed, or during the execution of the tasks, a task actual execution time database updater 530 may provide the actual execution time values. The actual execution time values can be written to a database or the like where the historical execution time information is collected. According to an embodiment, the instruction logic for modules 512-516 and 550 can be implemented in any programming language, and may be implemented as any combination of software, firmware, or hardware. According to an embodiment, programming logic for one or more of the modules 512-516 and 550 can reside in memory 504 and/or other computer readable medium such as persistent storage 506.

In operation, the user or the system can create a job and add tasks to that job when processing query requests. For example, upon receiving a service request, such as a query, the system can generate a job comprising one or more tasks to respond to the query. For example, task generator 514 can create the job and tasks required to respond to the query. Those tasks may be labeled, and the labels may provide a way to maintain a histogram of task execution time. The label of a task can indicate the type of the task (i.e. task type). To maintain historical execution time information, a histogram can be created for each label or task type. Initially, each task type or label may be set to 1 microsecond for the expected execution time. After a job specification is completed, every task may be measured to recursively compute the expected time from its beginning to the total task's completion. According to an embodiment, the calculation may be performed based on the measured median of the execution time of the tasks and the related dependent tasks. The tasks are then queued to a threadpool based on an order of their expected execution times, as derived from the measured median times. The use of the measured median reduces the sensitivity of the system to extreme outliers. Upon execution, the actual time required by each task is tracked and added to a histogram for a corresponding label. By scheduling tasks based on actual historical execution times of corresponding task types, the system is capable of dynamically adapting to the timing behavior of the entire set of tasks.

FIG. 6 illustrates a table 600 including task related fields of information on tasks and task execution times, according to an embodiment. Table 600, for example, can be a table in database 550 of actual execution times. Table 600 illustrates the details of a task type, and the date and time the task was initiated along with a time taken to complete the task (in microseconds or other unit of time measurement). Task types may include a "parse" task type and a "search" task type. A search query, for example, can include separate tasks for parsing the input query, searching based on the parsed query, filtering the received search results, ordering of the filtered results, and other tasks. Including the date and time of day of task execution enables the implementation of estimation of execution times for time of day periods, and/or moving window time periods. Other task types not mentioned in these examples may also be used and incorporated into the task tracking table. A person of skill in the art would understand that table 600 can be represented in many formats to collect and organize the task and task execution time information over time.

Figure 7:
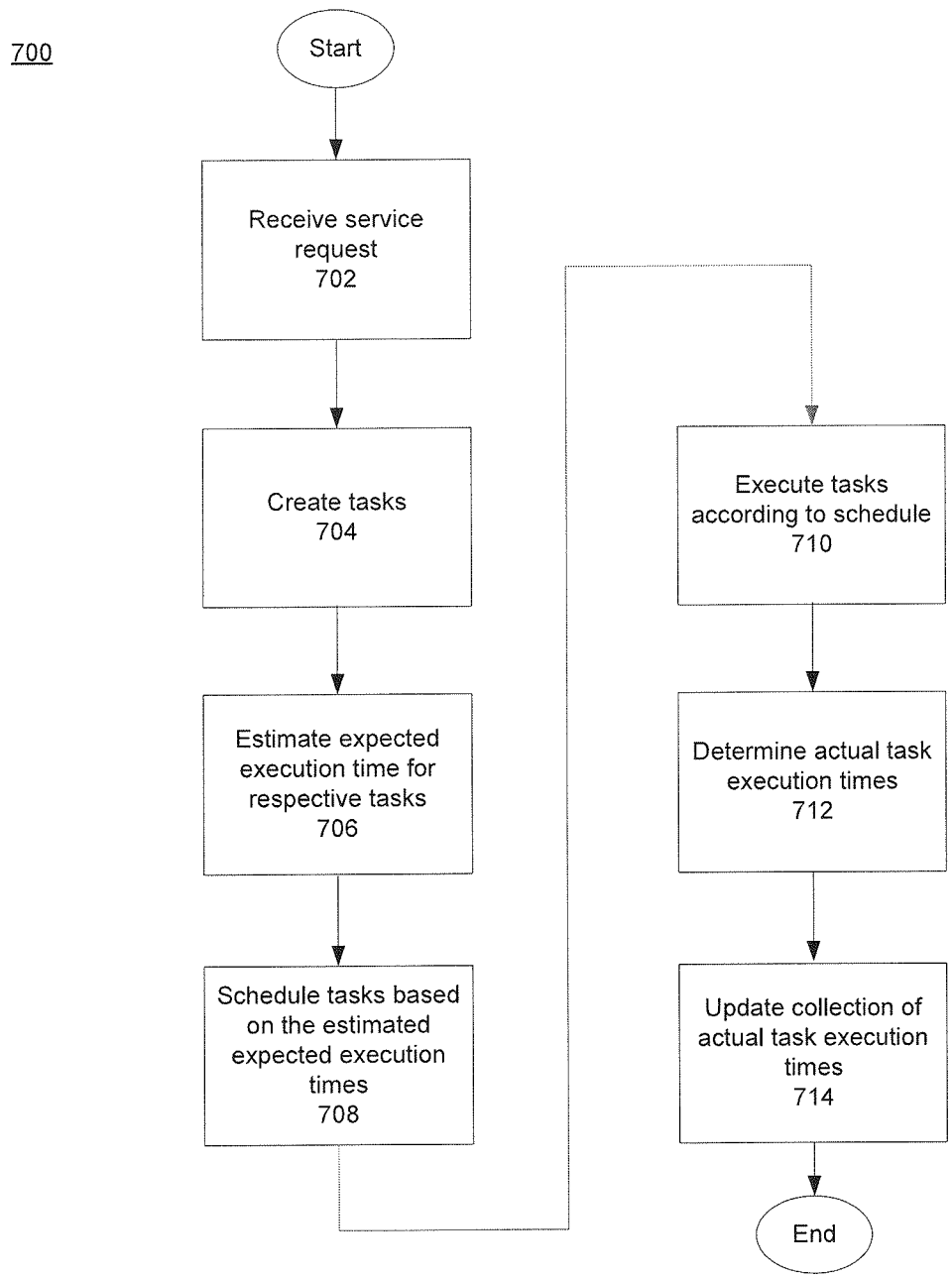
FIG. 7 illustrates a flow diagram of an example method of operation, according to an embodiment.

FIG. 7 illustrates a flow diagram of an example method for scheduling tasks using historical execution times, according to an embodiment. Referring to FIG. 7, an example method 700 includes operations 702-714.

At operation 702, a service request is received. For example, a web server can receive a search query from a web browser. The service request, such as a search query, may be in the form of a remote procedure call or other farm of procedure that causes a plurality of tasks and/or subtasks to be generated. Example service requests can include local data processing, such as database processing, data mining, and the like. Task scheduling according to embodiments can be of particular advantage in response time sensitive environments.

Other operations include creating tasks, at operation 704. According to an embodiment, in order to process and respond to a received search query, the system can create a plurality of tasks. The plurality of tasks created in response to a received search query can include a parsing task to parse the incoming query, a searching task to search the web or other search domain, a filtering task to filter the received results, and a prioritizing task to prioritize the filtered results according to some predetermined criteria before the results are displayed to the user.

At operation 706, expected execution times for respective tasks are estimated. According to an embodiment, for each of the tasks generated at operation 704, a task type is identified, and a estimated execution time based on the task type is determined from collected historical data of task execution times. The estimating of execution times for tasks is further described below with respect to FIG. 10.

At operation 708, tasks are scheduled based on the estimated expected execution times. According to an embodiment, the tasks of a job are scheduled in a manner so as to minimize the execution time of the job. For example, the scheduling is performed with the goal of minimizing the time to complete the execution of all tasks of the job. If, for example, the search query resulted in multiple searching tasks, the scheduling in operation 708 can attempt to schedule the multiple searching tasks in parallel or in a substantially overlapping manner. It should be noted that the goal of scheduling tasks, according to embodiments, is to lower or minimize the time to complete the execution of the job and is not necessarily to minimize the execution time of each task.

The tasks are executed according to the schedule at operation 710. According to an embodiment, execution of the tasks can be coordinated by a coordinating process and/or a parent process which creates each of the tasks. For example, a remote procedure call corresponding to a received search query can create a process to respond to the query. The process created to respond to the query can be referred to as a job. The job, in turn, can spawn a plurality of tasks to execute various processing tasks to respond to the query. The tasks can be executed in one or more processors. According to another embodiment, one or more of the processors executing the task can time-division-multiplex its execution so that more than one task can be executed on that processor concurrently. At operation 710, according to an embodiment, the tasks are executed according to a schedule of execution determined at step 708.

According to an embodiment, during the execution of the job, or substantially immediately thereafter, the actual task execution times are determined at operation 712. According to an embodiment, during the execution of the job, as each task is commenced and terminated, statistics that relate to the execution of those tasks are tracked. For example, for each task, the type of task, the start time, and the end time can be tracked and recorded in memory.

According to an embodiment, updating a data collection of actual task execution times is performed at operation 714. For example, the details regarding the execution time of each task and its task type can be recorded in a database. According to an embodiment, task execution time updater 530 can keep track of the execution time of tasks and record those details in the database of actual execution times 550.

Figure 8:
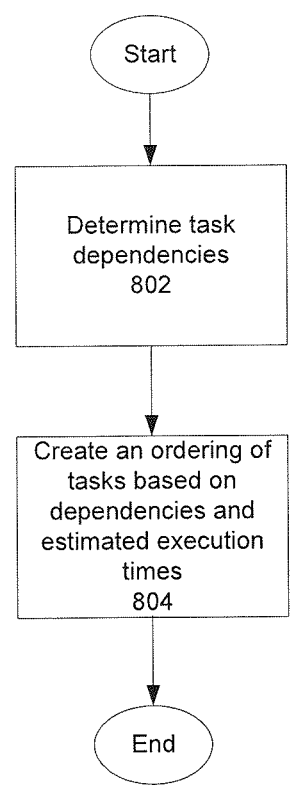
FIG. 8 illustrates another flow diagram of an example method of operation, according to an embodiment.

FIG. 8 illustrates a flow diagram of an example method 800 of scheduling tasks, according to an embodiment. Method 800, for example, can be used in performing operation 708 to schedule tasks based on the estimated execution times. Method 800, according to an embodiment, includes steps 802-804.

At operation 802, task dependencies are determined. According to an embodiment, all the tasks of the job are analyzed to determine any interdependencies. An exemplary method of determining interdependencies can be by way of constructing a dependency graph. Dependencies can include, for example, a second process waiting on input from a first process, a first and second process both accessing the same resource for reading or writing, and the like.

At operation 804, an ordering of the tasks is created based upon the dependencies determined at operation 802, and based on the estimated execution time of each task. According to an embodiment, the dependencies determine an initial ordering. For example, if a first process is dependent upon the output of a second process, then the second process is scheduled to execute before the first process. Having determined an initial ordering based upon dependencies, the scheduling may be optimized based upon the estimated execution times. For example, without violating dependency constraints, two or more tasks with short estimated execution times can be scheduled on one processor while a task with a long estimated duration is executed on a second processor.

Figure 9:
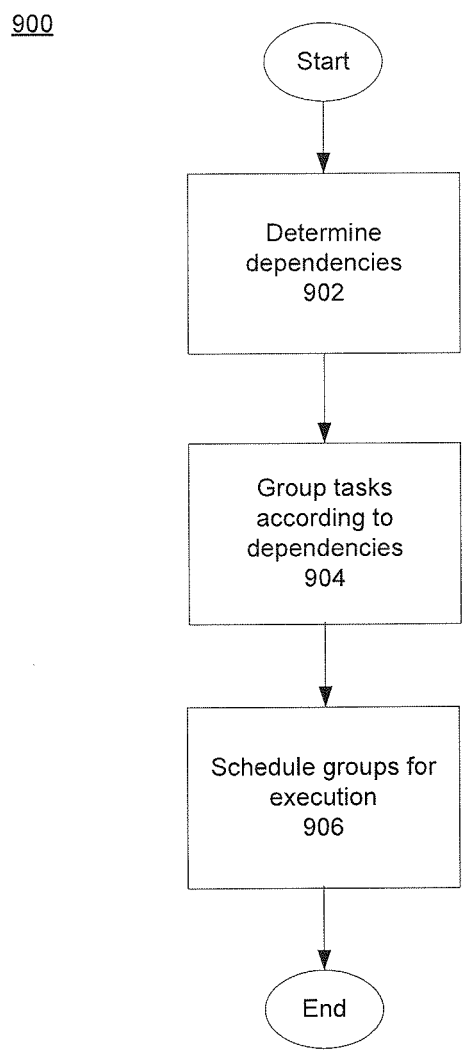
FIG. 9 illustrates yet another flow diagram of an example method of operation, according to an embodiment.

FIG. 9 illustrates a flow diagram of a method 900 of scheduling groups of tasks for execution, according to an embodiment. Method 900 may include operations 902-906. According to an embodiment, method 900 can be used in performing operation 708 to schedule tasks based on the estimated execution times.

At operation 902, dependencies of each task are determined. The determining of interdependencies among the tasks can be performed as described above.

At operation 904, the tasks are grouped according to the determined dependencies. According to an embodiment, each group will contain only tasks that have at least one interdependency with another task in the same group. According to the exemplary embodiment, there may be no interdependencies between respective groups, except that each respective group has a dependency to the parent process.

At operation 906, the respective groups are scheduled for execution. The respective groups can be scheduled for execution based upon the estimated execution times of the tasks in each group. For example, an aggregated estimated execution time can be determined for each group. The groups may be scheduled for execution, in much the same way as processes are scheduled for execution, so as to minimize the time from start to finish in completing the execution of all groups.

Figure 10:
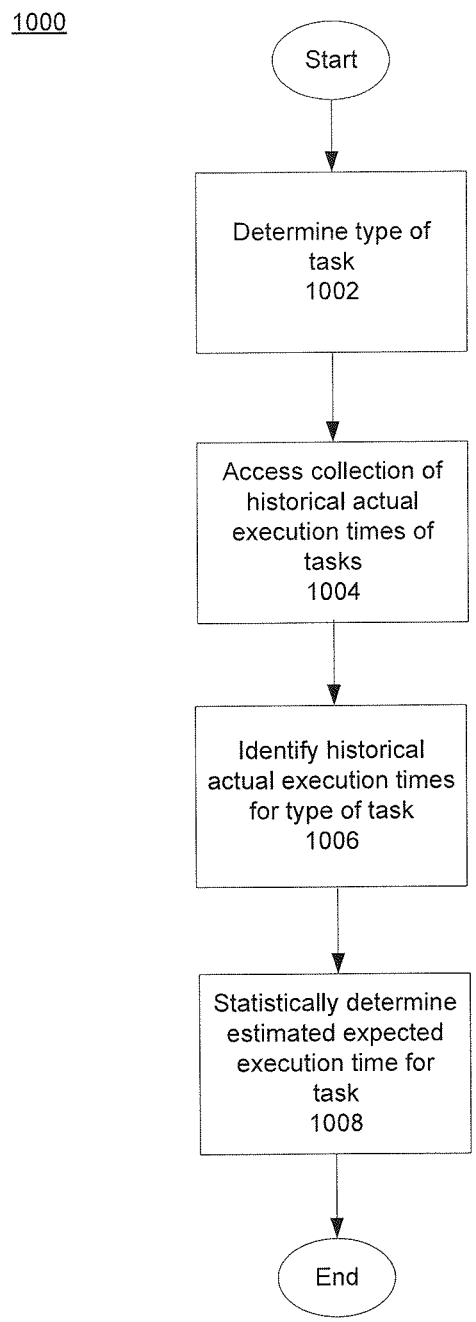
FIG. 10 illustrates still another flow diagram of an example method of operation, according to an embodiment.

FIG. 10 illustrates a flow diagram of an example method 1000 for estimating the expected execution duration of tasks, according to an embodiment. Referring to FIG. 10, an example method 1000 may include operations 1002-1008. According to an embodiment, method 1000 can be used in performing operation 706 of method 700 described above.

At operation 1002, the type of task is determined for each task. According to an embodiment, in a system for servicing search queries, each task may be categorized into one of a plurality of task types including search, parse, filter, and prioritize as described above. According to the embodiment, any task that does not belong to one of the above classes is categorized to a task type "other." A higher level of granularity with respect to task types (e.g., higher number of task types) can increase the accuracy of the estimation by increasing the likelihood that only tasks with like characteristics are in a particular task type. For example, when a task type contains only tasks with very similar characteristics the variation in execution times of those tasks can be relatively small.

At operation 1004, a collection of historical actual execution times is accessed for corresponding task types for each of the tasks. According to an embodiment, a database, such as database of actual execution times 550 can be accessed to obtain the execution time information.

At operation 1006, historical execution times for the particular task type corresponding to each respective task are identified. For example, for a search task, all entries corresponding to the search task type can be identified.

At operation 1008, an estimated expected execution time for each respective task is determined. According to an embodiment, the estimated execution time for each respective task is statistically determined based upon the accessed historical entries of the corresponding category. According to an embodiment, a mean of the actual execution times of the historical entries of the corresponding category can be considered as the estimated expected execution time for the particular task. Other exemplary statistical measures usable as estimated expected execution time include average, median, and percentage of maximum value.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of scheduling a plurality of tasks on one or more processors, comprising:
    determining a type for each task of the plurality of tasks;
    accessing a collection of actual execution times of previously executed tasks of said type;
    identifying actual execution times of the previously executed tasks of said type within a time period;

determining statistically the expected execution time for each said task based upon the identified actual execution times;

grouping tasks from the plurality of tasks into respective groups such that each grouped task is in a same group as other grouped tasks to which said each grouped task has at least one dependency;

determining an expected group execution time for each of the respective groups based upon the estimated expected execution time of each task in said each of the respective groups; and scheduling the respective groups for execution on the one or more processors based upon the determined expected group execution time for each of the respective groups.

2. The method of claim 1, further comprising:
determining one or more dependencies between any of the plurality of tasks, wherein the scheduling is further based upon the determined one or more dependencies.

3. The method of claim 1, wherein the scheduling comprises:
creating, using the estimated expected execution time of said each task, an ordering of tasks in each of the respective groups to minimize a duration to complete execution of a job, wherein the completion of the execution of the job includes execution of the plurality of tasks.

4. The method of claim 3, wherein the ordering is determined further using one or more dependencies among the plurality of tasks.

5. The method of claim 1, wherein the scheduling comprises:
identifying from the respective groups a first group and a second group that have no dependencies between them; and
scheduling the first group and the second group for substantially parallel execution.

6. The method of claim 1, wherein the scheduling the plurality of groups further comprises:
determining dependencies between the respective groups, wherein the scheduling of the respective groups is based upon the determined dependencies and the respective determined expected group execution time for each of said respective groups.

7. The method of claim 1 wherein the time period is based upon a predetermined daily time interval or a predetermined number of preceding days.

8. The method of claim 1, further comprising:
executing the plurality of tasks according to the scheduling;
determining an actual execution time and a type for said each task; and
updating the historical actual execution times of tasks for said type using the determined actual execution time of said each task.

9. The method of claim 1, further comprising:
determining, for said each task, a median of the historical actual execution times as the expected execution time.

10. The method of claim 1, further comprising:
receiving a request for service at a server; and
creating the plurality of tasks in response to the received request for service.

11. The method of claim 10, wherein the request for service is a query sent to the server from a web browser.

12. A system for scheduling a plurality of tasks on one or more processors, comprising:
one or more processors;
an execution time estimator communicatively coupled to the one or more processors and further configured to:
determine a type for each task of the plurality of tasks;
access a collection of actual execution times of previously executed tasks of said type;
identify actual execution times of the previously executed tasks of said type within a time period; and
determine statistically the expected execution time for each said task based upon the identified actual execution times; and
a task scheduler communicatively coupled to the one or more processors and further configured to:
group tasks from the plurality of tasks into respective groups such that each grouped task is in a same group as other grouped tasks to which said each grouped task has at least one dependency;
determine an expected group execution time for each of the respective groups based upon the estimated expected execution time of each task in said each of the respective groups; and
schedule the respective groups for execution on the one or more processors based upon the determined expected group execution time for each of the respective groups.

13. The system of claim 12, further comprising:
a database communicatively coupled to the one or more processors and configured to:
store historical actual execution times of tasks; and
provide access to the historical actual execution times of tasks based on a type of task.

14. The system of claim 12, further comprising:
a dependency determiner communicatively coupled to the one or more processors and configured to:
determine one or more dependencies between any of the plurality of tasks, and wherein the scheduling is further based upon the determined one or more dependencies.

15. The system of claim 12, wherein the task scheduler is further configured to:
create, using the estimated expected execution time of said each task, an ordering of the tasks in each of the respective groups to minimize a duration to complete execution of a job, wherein the completion of the execution of the job includes execution of the plurality of tasks.

16. The system of claim 12, further comprising:
one or more servers coupled to the one or more processors, and further configured to:
receive a request for service; and
create the plurality of tasks in response to the received request for service.

17. A computer program product comprising a non-transitory computer readable storage medium having computer program logic recorded thereon that, when executed by a processor, enables the processor to schedule a plurality of tasks on one or more processors, said computer program logic comprising:
a first logic module configured to:
determine a type for each task of the plurality of tasks;
access a collection of actual execution times of previously executed tasks of said type;
identify actual execution times of the previously executed tasks of said type within a time period; and
determine statistically the expected execution time for each said task based upon the identified actual execution times; and
a second logic module configured to:
group tasks from the plurality of tasks into respective groups such that each grouped task is in a same group as other grouped tasks to which said each grouped task has at least one dependency;
determine an expected group execution time for each of the respective groups based upon the estimated expected execution time of each task in said each of the respective groups; and
schedule the respective groups for execution on the one or more processors based upon the determined expected group execution time for each of the respective groups.

* * * * *